March 18, 1969  K. SCHOLZEL  3,433,672
ELECTRICAL BATTERY
Filed July 5, 1966

United States Patent Office 3,433,672
Patented Mar. 18, 1969

3,433,672
ELECTRICAL BATTERY
Karl Scholzel, Bad Soden, Taunus, Germany, assignor to Werner Greutert, Baden, Switzerland
Filed July 5, 1966, Ser. No. 562,760
Claims priority, application Switzerland, July 8, 1965, 9,768/65
U.S. Cl. 136—6
Int. Cl. H01m *35/02*
23 Claims

ABSTRACT OF THE DISCLOSURE

A rechargeable electrical battery cell having at least one metallic positive electrode and an electrolyte containing anions which are capable of reacting, during charging of the battery, with the metal of the positive electrode and with the primary reaction products formed thereat during charging, to produce negatively charged complex ions which are soluble in the electrolyte. The battery also contains a negative electrode which in the charged condition of the battery contains an amalgam of at least one metal selected from the group consisting of alkali and alkaline earth metals.

---

The invention relates to an electrical battery. Swiss patent application No. 13,158/63 of October 25, 1963 describes a batttery whose construction and properties differ substantially from hitherto known types. Both the negative and the positive electrodes of this battery consist in the uncharged state of mercury, and the electrolyte is an aqueous solution of alkali and alkaline earth, hydroxide or a mixed solution of such hydroxides.

During the charging of this battery there is formed at the negative electrode an alkali or alkaline earth amalgam, while mercury oxide forms at the positive electrode. During this charging period, the concentration of the ions dissolved in the electrolyte is reduced.

During discharge, the alkali or alkaline earth atoms dissolved in the amalgam of the negative electrode are again dissolved as ions with positive charge, while the mercury oxide at the positive electrode is reduced to metallic mercury. During this discharging period, the concentration of the ions dissolved in the electrolyte rises again. The mercury oxide particles formed during the charging tend to become detached from the metal phase of the positive electrode and should, since they are poor electrical conductors, be pressed by mechanical means, for example, by means of a porous elastic diaphragm, into the residual mercury phase so that as large a part as possible of the oxide always makes contact with the metal surface of the electrodes and can be reduced to mercury during the discharge.

An object of the present invention is to provide a battery in which not only the negative but also the positive electrode may be kept free at least in part from nonmetallic insoluble reaction products. A further object of the invention is to maintain the metal surfaces of the negative and the positive electrodes in direct contact with the electrolye during charging and discharging while establishing that all chemical reactions occurring during the charging and discharging are reversible.

According to the invention this object may be realized in that the electrolyte contains substances which are capable of detaching the primary reaction products formed at the electrodes, wherein these solutions are adapted to the electrode material.

The alkali and alkaline earth amalgams described in the aforesaid Swiss patent application No. 13,158/63 are very suitable as materials for the negative electrode since the reaction products formed therefrom during the discharging are the corresponding alkaline or alkaline earth cations which are easily soluble in the electrolyte. However, apart from mercury other liquid metals may also be used, for example, gallium or other metallically conducting liquids, for example, melts of Wood's or Rose's alloys, as solvents for the alkaline and/or alkaline earth atoms deposited during the charging.

The invention contemplates an electrical battery with a basic electrolyte, and more particularly an aqueous solution containing an alkaline and/or alkaline earth hydroxide, and a negative electrode consisting preferably in the uncharged or discharged state of mercury, receiving during the charging alkaline and/or alkaline earth metal cations from the electrolyte and amalgamating as alkaline metal and/or alkaline earth metal, and surrendering during the discharge the same as cations to the electrolyte under simultaneous regeneration to mercury or to a lower concentrated amalgam.

According to the invention this is realized in that the electrolyte contains additional dissolved anions of at least one complex former substance which can form, in reaction with the metal of the positive electrode and the primary reaction products formed therein, complex ions of negative charge which are suitable in the electrolyte wherein during the charging of the battery at least one part of the mass of the positive electrode forms at least one soluble compound so that in the partly or fully charged state an equivalent part of the mass of the positive electrode is dissolved in the electrolyte and during the discharging of the battery the complex ions are discharged at the positive electrode and disintegrate on the one hand into free complex former substance remaining in solution in the electrolyte and on the other hand into metal atoms combining again with the residual metal of the positive electrode under simultaneous restoration of the uncharged initial state.

In an embodiment of the invention, the battery is formed as a unit assembled in the charged state, whose negative electrode consists of alkali and/or alkaline earth amalgam while the positive electrode contains a metal soluble in the electrolyte during the recharging and the alkaline electrolyte contains complex ions of this metal.

The manufacture of the battery as a structural unit in an a priori charged condition is based on the consideration that the battery according to the invention is, in principle, a galvanic element whose chemical reactions are largely reversible. The rechargability of the galvanic element need not necessarily be used technically under all conditions. Since the electrical battery according to the invention has a particularly high efficiency, the considerations on which the invention is based and the further modifications of the general principle of the invention may also be used with advantage with galvanic elements which are not to be recharged, and more particularly with fuel cells.

The materials for the positive electrode may be composed of all metals which are capable of forming soluble complex ions with negative charges. The electrolyte must contain, in addition to the alkali or alkaline earth, cations also those anions which are capable of forming soluble complex ions with negative charges with the reaction products primarily formed at the positive electrode.

In a preferred embodiment of the invention the positive electrode consists in the uncharged state of mercury, and preferably of pure mercury. It is therefore in this case the same material as preferably provided for the negative electrode. The use of at least partly identical material constituents for both electrodes is convenient for manufacturing and maintenance reasons. The invention will be further described by way of example with reference to the accompanying drawing showing several embodiments of the battery according to the invention in its simplest construction, always with two electrodes, and in which:

Figure 1:
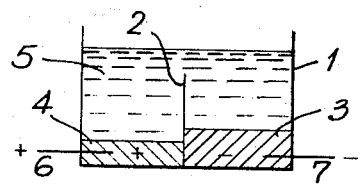
FIG. 1 shows an embodiment in longitudinal cross section.
Figure 3:
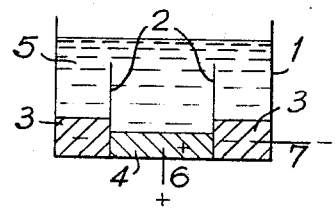
FIGS. 3 and 4 show a further embodiment of the battery of cylindrical construction in axial cross section and viewed from the top respectively.
Figure 2:
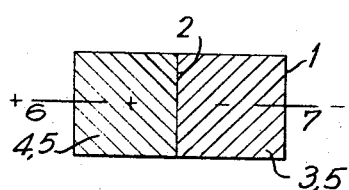
FIG. 2 shows the embodiment of FIG. 1 viewed from above.
Figure 4:
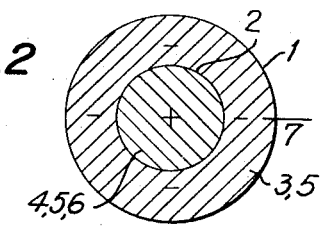

FIGS. 1 to 4 show two embodiments of the battery according to the invention wherein in the uncharged state both electrodes are mercury or a liquid alloy. The housing 1 is divided by a partition 2 into a negative electrode chamber 3 and a positive electrode chamber 4. Both electrode chambers are covered by the same electrolyte solution 5 whose level is higher than the partition 2. Reference numerals 6 and 7 indicate the outer terminals made from an electrically conducting substance which is insoluble or only slightly soluble in the electrolyte and in the electrode material. After charging for a period of time, the originally liquid material of the negative electrode 3 can solidify to a solid amalgam or alloy, owing to the separation of alkali and/or alkaline earth metal. The material of the positive electrode 4 is partly or fully consumed and dissolves in the electrolyte phase 5. During the discharge of the battery, the material of the positive electrode is again deposited from the electrolyte 5 at the positive terminal 6 or at a residue of the positive electrode 4, while alkali and/or alkaline earth atoms pass as ions into the electrolyte 5 from the material of the negative electrode 3.

During the application of a D.C. voltage which is higher than the terminal voltage of the battery, for example, about 2 v., the alkali ions (for example potassium ions), of the electrolyte migrate to the negative electrode, are discharged there, and form a potassium amalgam.

The hydroxide and cyanide ions migrating to the positive electrode form, during their discharge, mercury oxide and mercury cyanide. Both compounds form with the excess potassium cyanide of the electrolyte, soluble complex salts according to the formula:

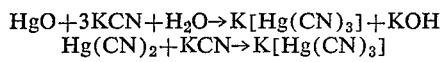

$$HgO + 3KCN + H_2O \rightarrow K[Hg(CN)_3] + KOH$$
$$Hg(CN)_2 + KCN \rightarrow K[Hg(CN)_3]$$

The compound $K[Hg(CN)_3]$ dissociates in an aqueous solution into positively charged potassium ions and into negatively charged complex ions $[Hg(CN)_3]$.

During the discharging of the battery the potassium contained in the amalgam of the negative electrode dissolves in the electrolyte under restoration of the potassium ions, while the negative $[Hg(CN)_3]$ ions release their charge at the positive electrode and disintegrate into metallic mercury and three cyanide ions. In this way, the initial uncharged state may be restored. The restored mercury combines immediately with the residual mercury which remained in the positive electrode while the free cyanide ions remain dissolved in the electrolyte.

Since these processes are fully reversible, the charging and discharging cycles may be repeated as often as desired.

As already mentioned, the battery according to the invention, may be assembled as a unit, if required in the charged condition. This will be described in conjunction with the preceding embodiment.

To this end, a positive electrode of mercury and a negative electrode of potassium amalgam are immersed into an electrolyte consisting of an alkaline solution of complex potassium mercury cyanide. So long as the negative electrode still contains (as amalgamates) potassium atoms and so long as the complex mercury cyanide is present in the electrotyte, the battery is capable of supplying current. After the discharge, the cell may be restored to its charged initial condition by applying a D.C. voltage, which is larger than the terminal voltage of the battery, for example about 2 v.

The battery according to the invention is fully charged when the mercury of the negative electrode can absorb no more potassium atoms. Potassium ions discharged after that stage react with the water of the electrolyte with formation of gaseous hydrogen. Although this is not in itself desirable, the formation of hydrogen may be used, according to a further feature of the invention, in conjunction with means known in the art for indicating that full charge has been reached, so that on the formation of hydrogen the charging is discontinued or automatically stopped. This may be realized, for example, by introducing the formed hydrogen into an electrical capacitor in a control circuit so that the capacitor is detoured and the charging process is thereby interrupted.

The battery is also full charged when the mercury of the positive electrode has completely dissolved in the electrolyte so that only the current leads remain of this electrode. Conveniently, these wires are made of a material which is insoluble or only slightly soluble in the electrolyte. On the other hand, it is also possible for the capacity of the negative electrode to be smaller than that of the positive electrode so that after completion of the charging, the positive electrode still has a certain charging reserve while the negative electrode can absorb no further charge.

If the positive electrode contains more mercury than can be absorbed by the electrolyte as soluble salt, the mercury is covered during further charging with a grey layer of slightly soluble mercury cyanide or an equally slightly soluble basic mercury cyanide. Since these compounds do not inhibit the further flow of current, the battery may be charged further even under these conditions so that the active mass for the positive electrode contains both dissolved mercury cyanide complex ions and undissolved mercury cyanide.

The slightly soluble mercury cyanide may also form temporarily during the charging if the charging current is chosen so high that more mercury cyanide is formed than may be complexly dissolved by the cyanide ions available through diffusion from the electrolyte.

If, according to a further feature of the invention, continuous mixing of the electrolyte is effected, no differential concentrations can occur within the electrolyte phase and the surface of the mercury will remain bright until almost all cyanide ions are complexly fixed. Both compounds, namely, the undissolved mercury cyanide and the dissolved complex mercury cyanide may be used technically for producing current and yield metallic mercury during the discharge of the battery.

The mixing of the electrolyte may be effected, at least during the charging, either by agitating the liquid electrolyte or by vibrating or shaking the vessel of the battery. Both these methods may be used simultaneously or alternatively. According to one embodiment, the liquid may be agitated by an agitator at least the surface of which is inert with respect to the electrolyte. The agitator can be driven directly or indirectly by a motor. The agitator may be suspended in the center of the vessel. According to a very simple arrangement, the agitator is formed by a magnet covered with synthetic resin, arranged on the bottom of the vessel and driven by a rotating or oscillating magnet actuated continuously or intermittently when required. According to another arrangement the electrolyte vessel and the electrodes are relatively movable. In a particularly simple arrangement, the entire vessel of the battery is mounted on a vibrator.

The battery, hereinbefore described by way of example, has in the charged condition, a terminal voltage of about 1.6 v. Its specific internal resistance is low. So long as no insoluble reaction products are formed, there are no transfer resistances within the electrode, such as occur for example between lead dioxide and lead, or lead sulphate and lead in the electrodes of lead batteries. The specific internal resistance of the electrolyte is a function of the concentration of the ions dissolved therein. For this reason the current intensity can vary both during charging and during discharging. If care is taken that the electrolyte contains always an excess of potassium and hydroxide ions, the changes of the internal resistance are negligible from a practical point of view.

The materials for the negative electrode may comprise, apart from the binary alkali and alkaline earth amalgams also metallic multicomponent systems of the kind described in Swiss patent application No. 13,158/63. According to the choice of the cations dissolved in the electrolyte or the metals amalgamated with the mercury of the negative electrode, different properties of the battery may be varied, for example, its terminal voltage, the internal resistance, the capacitance related to the unit of volume or to the unit of weight, the loadability, self discharge, and the like.

Thus, it is for example, advantageous for the electrolyte to contain sufficient alkali or alkaline earth and hydroxide ions that the internal resistance of the battery is as low as possible and changes as little as possible during the charging and discharging.

According to a further preferred embodiment of the invention, the battery has a low self discharge, if the electrolyte contains sodium hydroxide in a concentration of more than 20 percent by weight and preferably between 20 and 50 percent by weight.

In order to achieve a comparatively high terminal voltage of the battery, an electrolyte solution is preferably used containing between 20 and 50 percent potassium hydroxide. A battery with a comparatively high output can be obtained with an electrolyte containing a solution of lithium hydroxide, particularly in highly concentrated form.

According to another convenient embodiment of the invention, there is provided an electrolyte in saturated form with a solid phase, consisting particularly of an alkali or alkaline earth hydroxide solution or solutions containing several components such as NaOH, LiOH, Ca(OH)$_2$. This produces a battery with comparatively low self discharge.

The material for the positive electrode may be formed in principle by those metals which can form with the ions of the electrolyte, soluble, negatively charged complex ions. Preferably, these complex ions are such that they tend to dissociate as little as possible into their constituents.

A complex ion $[ZL_m]^{(m-n)-}$ with the $n$-valent central atom Z and $m$ monovalent attached atoms L dissociates in an aqueous solution according to the general formula:

$$[ZL_m]^{(m-n)-} \rightarrow Z^{n+} + mL^-$$

into its components. According to the law of mass action, the dissociation constant of this process is:

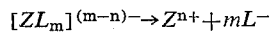

$$K_D = \frac{[Z^{n+}][L^-]^m}{[ZL_m(m-n)-]}$$

The smaller $K_D$, the more stable is the complex ion and the less will the battery tend to self discharge, since the self discharge can take place by exchange between the ions $Z^{n+}$, dissolved in the electrolyte with the alkali or alkaline earth atoms contained in the amalgam of the negative electrode according to the general formula:

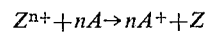

$$Z^{n+} + nA \rightarrow nA^+ + Z$$

where A is the alkali metal atom and $A^+$ the alkali cation.

For many complex ions $K_D$ has very low values, for example for the ion $[Cu(CN)_4]^{3-}$, $K_D$ is smaller than $10^{-27}$. In addition, the dissociation process described is not spontaneous, but slow. This has the special advantage that the battery according to the invention has a small self discharge even after being allowed ot stand for days.

Figure 5:
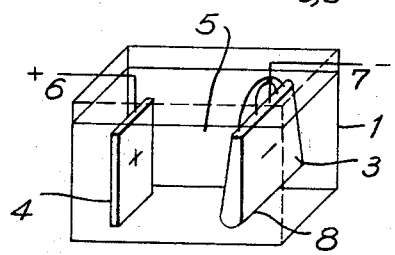
FIG. 5 shows in perspective view another embodiment of the battery.

The embodiment of FIG. 5 shows the vertical arrangement of both electrodes of a partly or fully discharged battery. The positive electrode 4 consists of a metal plate while the liquid metal of the negative electrode 3 is filled into a flat bag 8 of porous material such as plastic, textile fibre or paper, which is resistant to alkali, so that the ions of the electrolyte 5 can penetrate the pores of the bag while the metal atoms of the negative electrode 3 cannot pass through these pores. In this or similar constructions, the partition 2 shown in FIG. 1 to 4 is not necessary.

It is also possible to replace the metal plate 4 by a liquid alloy or liquid metal for the positive electrode 4 in a corresponding bag.

Similar to mercury and copper, many other metals form with cyanide ions and with a large number of other ligands stable, soluble complex ions with negative charges, for example, silver, gold, the metals of the platinum group, iron, cobalt, nickel, zinc, cadmium. For this reason, these materials are used preferably as materials for the positive electrode. By a correct choice form the above mentioned list of metals the most suitable, possibly combined electrode material may be chosen for any particular application. For example, silver, gold, and platinum produce high terminal voltages.

The range of application of the positive electrode to different uses may be widened further by constructing it of several components, in a manner similar to that described in conjunction with the negative electrode. More particularly, its material may consist of an alloy of at least two metals. It may be convenient if the individual components of the alloy have solution and deposit potentials which differ only slightly from each other, as, e.g., in the case of cobalt and nickel. If the material for the positive electrode is a cobalt nickel alloy, during the charging of the battery, cobalt and nickel are simultaneously dissolved at the positive electrode by an electrolyte containing cyanide and again deposited on the positive electrode when the battery is discharged. In a similar manner, also copper-zinc, copper-tin and/or other alloys may be used as material for the positive electrode.

For producing a particular low terminal voltage which is required for different purposes, a positive electrode is used consisting at least partly of one of the following elements: iron, cobalt, nickel, zinc, and/or cadmium. According to a further feature of the invention, the positive electrode is constructed in at least two layers. Here again, each individual layer may consist either of a metal or of a metal alloy.

Figure 6:
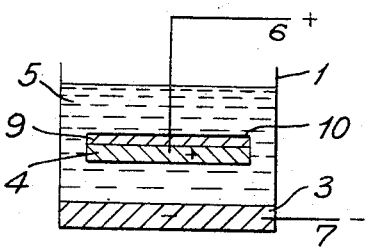
FIG. 6 shows an embodiment of the battery in the uncharged condition with a two-layer positive electrode.

A preferred embodiment of this kind is shown in FIG. 6. The positive electrode is constructed in two layers. During the charging of the battery, the less noble layer 4 dissolves first in the electrolyte phase, while the layer 9 of a more noble metal begins to dissolve with higher charging voltage, after the layer 4 has been completely removed. Preferably, the positive terminal 6 of insoluble material is such that its end surface 10 immersed in the electrolyte 5 has substantially the same area as that of the active mass 4 and 9, respectively, of the positive electrode. In this way, during the discharge of the battery, the material of the positive electrode will again be deposited in substantially the same geometrical configuration, without forming lumps or so-called "trees."

In a similar manner, the terminal 6 of FIG. 5 may also be formed as an insoluble support frame with the same area as the positive electrode 4, in order to maintain the required geometrical configuration of the electrode over many charging and discharging cycles. A first electrode layer 9 is mounted on a carrier plate 10 and is covered with a second electrode layer 4. During the charging of the battery, the first outer layer of nickel is dissolved. When the nickel has been dissolved, the current density drops suddenly during the further charging, because from then on, the electrode consists of another material, namely silver, which is dissolved during the continuing charging. It is here assumed that at least from this instant on, the charging current preferably is higher than the terminal voltage of the cell consisting of silver on the one hand, and of alkali amalgam on the other hand.

During the discharging of the cell, the processes hereinbefore described take place in the reverse order. First, with higher terminal voltage, the silver is precipitated from the complex ion on the positive carrier plate 10. Then, the terminal voltage drops suddenly to the deposit potential of nickel, and during further discharge, nickel is deposited from its complex ion onto the silver layer 9 until either the electrolyte contains no more complex ions, or the negative electrode has been fully discharged. The last deposited nickel again forms the second layer of the positive electrode layer 4.

This layered configuration of the positive electrode 4 has the advantage that the measurement of the terminal voltage of the battery affords an indication of its state of charge, because the occurance of the voltage jump shows that, immediately before the jump, the partial capacitance of the silver layer is still available with full reliability. According to a further feature of the invention, this measurement may be used for controlling means, such as are known in the art, for example, relays, whereby at least one signal may be generated—possibly after a further discharge period which can be measured by known means— indicating the necessity of recharging the battery, or for initiating this recharging process automatically, for example, with stationary batteries.

Instead of the substances hereinbefore mentioned, silver and nickel, other constituents of a multilayer electrode may also be employed, if their deposit or solution potential are sufficiently widely spaced.

The invention also comprises various embodiments for the electrolyte, and these may again be adapted to the intended use of the apparatus.

For most applications it is desirable to achieve during the charging of the battery a high current yield and in the charged condition a low self-discharge. As already mentioned, this object is realized in that at least one alkali or alkaline earth hydroxide is dissolved in the aqueous phase of the electrolyte, in addition to the complex former substance, since the higher pH value resulting therefrom suppresses the development of hydrogen at the negative electrode in an increasing manner. This increases the current yield during the charging and reduces the self-discharge.

Apart from that, this type of electrolyte is also recommended, because numerous complex ions of the heavy metals are sufficiently stable only in alkaline solutions. With pH values below 7, even with the cyanides recommended in the embodiment as complex former substances, hydrocyanide acid would escape in the form of a gas, and this should be avoided at any cost.

Thus, for avoiding the formation of toxic substances, it may be desirable, for example, to replace the cyanide ions in the electrolyte phase by rhodanide ions, which form soluble, negatively charged complex ions with many of the heavy metals. The same object, namely the prevention of the formation of toxic substances, may also be achieved by a plurality of organic anions, e.g., formiate, acetate, propionate, oxalate, tartrate, citrate.

Also the anions of, for example, the amino acids, the chloroacetic acids, and the like, as well as their substituted derivatives, may be used for the same purpose. Also other organic compounds form soluble complex ions with negative charges with heavy metals. These comprise, for example, the complexons and chelate complexes, hitherto used only for other purposes, such as, for example, of the nitriloacetic acids, the ethylene diamine tetraacetic acid, the aniline diacetic acid.

Many ligands may be combined with each other, giving rise to the formation of complexes which are built up from several components. In addition, also uncharged ligands may be added together with negatively charged ligands to heavy metal atoms. For example, in the aquo and amino complexes, water or ammonia molecules may be arranged together with negatively charged groups around the central atom.

Also the hydroxide ion itself may form soluble, negatively charged hydroxo complexes with amphoterically reacting metal hydroxides, for example, zinc, aluminum, titanium hydroxide or the like, such as:

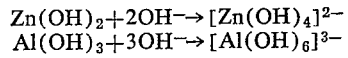

$$Zn(OH)_2 + 2OH^- \rightarrow [Zn(OH)_4]^{2-}$$
$$Al(OH)_3 + 3OH^- \rightarrow [Al(OH)_6]^{3-}$$

In this case, the electrolyte consists only of an aqueous alkali or alkaline earth hydroxide solution without other complex formers.

From such hydroxo complexes, oxo complexes may be formed by separating water, and these are similarly suitable as electrolyte components, according to the following formula:

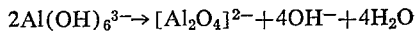

$$2Al(OH)_6{}^{3-} \rightarrow [Al_2O_4]^{2-} + 4OH^- + 4H_2O$$

Of this group, particularly important are the complex anions of tin, arsenic and antimony, i.e., for example, the stannites and stannates, owing to their property of assuming several valences. The central atom occurs here in two valences. For example, if arsenic is anodically oxidized in the presence of hydroxide ions, first the arsenite ion $[As^{III}O_3]^{3-}$ is formed and then, in a further reaction stage, the arsenate ion $[As^{V}O_4]^{3-}$ is formed. Both negatively charged ions are easily soluble in the electrolyte phase.

During the charging of the battery, first arsenite is formed at the positive electrode from the arsenic, until the material of the electrode has been completely dissolved. Then, there occurs a potential jump, following which during the further charging, the arsenite dissolved in the electrolyte is oxidized to arsenate at the positive electrode core, consisting, for example, of graphite, magnetite or another insoluble material.

During the discharging of the battery, first, with higher voltage across the terminals, the arsenate is reduced to arsenite at the positive electrode. Then the terminal voltage jumps to a lower value, and during the continuing discharge, metallic arsenic is again deposited at the positive electrode.

The said potential jump may be utilized, by measuring the terminal voltage, for checking the state of charge of the battery by means of a suitable indication means which may also actuate a control means.

It should be mentioned that the oxygen in these complex compounds of tin, arsenic and antimony may also be replaced by other ligands. Thus, for example, when the oxygen is replaced with sulphur, the known thio arsenates and thio arsenites are formed.

Other heavy metals, such as chromium, manganese, vanadium, molybdenum, and the like, form soluble complexes with negative charges with hydroxyl or oxo groups only in the higher valences. For example, chromium may be oxidized anodically to form the insoluble chromium (III) hydroxide $Cr(OH)_3$. By continuing the anodic oxidation, this may be transformed into the easily soluble, negatively charged, chromate ion $CrO_4{}^{2-}$, in which chromium is present in the hexavalent stage. This anion is suitable in principle for use in the battery according to the invention. However, the insoluble chromium (III) hydroxide, which is present in the form of a spongy precipitate, presents certain difficulties as active electrode material. After several charging and discharging cycles the properties of the battery change, for example, its capacitance is reduced, owing to the increasing formation of electrode sludge, which is no longer in contact with the positive electrode and cannot, therefore, be used as active mass. The same also applies to other metals forming an insoluble hydroxide with lower valence.

However, this difficulty may be overcome in that the electroylte contains, in addition to the hydroxide ions, also further complex formers which are capable of transforming the lower valence hydroxide into a soluble compound.

In the same way as the organic complex formers hereinbefore described, also inorganic ligands may be combined with many heavy metals to form soluble, negatively charged, complex ions. To this end, the use of nitrite, pyrophosphate and halide ions is known. The present invention also comprises the use of these as constituents of the electrolyte. Thus, for example, iron forms in the presence of excess fluoride ions, the soluble complex ion $FeF_6^{3-}$ with triple negative charge. This example also demonstrates the possibility of using iron for the purposes of the present invention. This is important, since the first examples, according to which, gold and metals of the platinum group were used, are not meant to imply that the battery according to the invention can be constructed only from very expensive materials. The present embodiment shows that also less expensive materials may be used, in principle, for constructing the battery according to the invention, and this is important especially for large, high-capacity, batteries.

In this connection it should be stressed that certain derivatives of sulphuric acid, for example, the chlorosulphonic acids and the sulfamic acid also form, with various heavy metals, soluble, negatively charged, complex ions which are suitable for use in the battery according to the invention.

It is also within the frame of the invention to combine inorganic ligands with organic groups as well as with uncharged ligands, for example, with water or ammonia, in order to enrich the electrolyte with negatively charged complex ions.

In a particularly preferred embodiment of the invention, the electrolyte of the battery has a composition, such that after the completed charging of the battery, all complex forming anions are fixed and the surface of the positive electrode is covered with a layer of insoluble reaction products which prevent the further flow of the charging current. This provides a battery, the charging of which need not be supervised at all, because the charging current is automatically interrupted. This may be exemplified by an embodiment in which the negative electrode consists in the charged condition of an alkali or alkaline earth amalgam and in the uncharged condition of mercury, while the positive electrode consists of mercury or a heavy metal amalgam, and the electrolyte contains iodide ions in addition to alkali or alkaline earth hydroxide ions.

During the charging of this battery, an alkali or alkaline earth metal amalgam is formed at the negative electrode, as described above, while at the positive electrode, primarily mercury iodide $HgI_2$ (and possibly the iodides of amalgamated components) are formed, which are immediately dissolved by the excess of iodide ions:

$$HgI_2 + 2KI \rightarrow 2K^+ + [HgI_4]^{2-}$$

When no more free iodide ions are available in the electrolyte at the positive electrode, the same is covered with a layer of insoluble mercury iodide (and possibly with the insoluble iodides of the amalgamated constituents therein), which adheres thereto and blocks the further flow of current. This practically terminates the charging of the battery which is thereby discontinued automatically.

In order not to maintain the charging voltage unnecessarily across the terminal of the battery, through which current no longer flows, the charging current circuit contains conveniently a holding relay, by means of which the charging voltage is automatically switched off with declining current intensity.

During the discharging of the battery, this blocking layer is again dissolved so that during the continuing discharge, the complex ions dissolved in the electrolyte can freely pass to the electrode and react thereon:

$$[HgI_4]^{2-} \rightarrow Hg^0 + 4I^-$$

During this process, there occurs therefore the reconstitution of metallic mercury and free iodide ions.

Where the high capacitance is required, it is therefore necessary to choose the quantity of the electrolyte and its concentration of iodide ions as high as possible. Into a smaller quantity of electrolyte, also a saturated iodide solution with solid phase, e.g., potassium iodide, may be admixed.

The minimum amounts of electrolyte and electrode materials may be calculated by means of the stoichiometric relations of the reaction equations. In order to obtain, for the battery hereinbefore described, a capacitance of 26.7 ah., the positive electrode must contain at least 100.3 grams of mercury and the electrolyte, in addition to any desired quantity of alkaline hydroxide, 322 grams of potassium iodide.

The amount of mercury in the negative electrode must be such that it can fix the 39.1 grams of potassium, precipitating there, in the form of amalgam. To this end, a quantity of 500 grams of mercury has proven sufficient. This may also be larger or smaller, if the charging current density is so high that the battery is strongly heated. The reason is that, with higher temperature, the alkali or alkaline earth metal amalgams remain liquid even with higher concentrations, and this liquid state has proved to be of advantage for the deposit of the alkali and alkaline earth atoms. In addition, the solidification of the amalgams occurs comparatively slowly so that it is preferably, for this reason alone, to keep the charging time as short as possible with high current density.

Although alkali or alkaline earth atoms are deposited also at a solidified amalgam, these diffuse much more slowly into the interior of the electrode than in the liquid state. Owing to the enrichment of alkali or alkaline earth metal on the surface of the electrode, larger quantities of hydrogen are formed by reaction with the water of the electrolyte, and this hydrogen escapes as a gas.

The solvents for the constituents of the electrolyte may also be substances other than water, for example, alcohols, ketones, pyridine, dimethyl sulfoxide. However, the internal resistance of such batteries with nonaqueous solvents is substantially greater than that of batteries with aqueous base.

Chloride and bromide ions react with the mercury of the positive electrode in a manner similar to iodide. But, the iodide ion has the strongest tendency to form complex ions. If the potassium iodide proposed above were replaced by potassium chloride or potassium bromide in the electrolyte, the charging of the battery would be blocked, under otherwise identical conditions, much earlier by the formation of a barrier layer of $HgCl_2$ or $HgBr_2$ so that the capacitance of the battery would be correspondingly smaller than with the addition of iodide.

The complex ions formed during the charging of the battery are distributed by convection, and diffusion uniformly through the electrolyte phase.

The loss of electrical energy, caused by the rise in the entropy occurring under these conditions, can be partly compensated according to a further feature of the invention, by dividing the electrolyte phase into two reaction chambers by means of a semipermeable diaphragm.

This diaphragm is so chosen that the smaller ions, such as the alkali and alkaline earth cations, and the simple anions of the complex formers and hydroxide, ions, can pass through the pores of the diaphragrm, while the substantially larger complex ions are retained. Such diaphragms and filters, made, for example, of synthetic resins, cellulose, sintered metal foils and the like, are known in the art from the working methods of dialysis and osmosis.

The soluble, negatively charged complex ions formed during the charging of the battery cannot leave the chamber surrounding the positive electrode, and formed by the diaphragm, while all other ions can diffuse through the diaphragm in both directions.

This has the advantage that the reaction chamber surrounding the negative electrode remains comparatively free from complex ions so that even the very minute dissociation of such complex ions and the discharge of the central atom at the negative electrode, connected therewith, are prevented. This measure substantially reduces the self-discharge of the battery. If the semipermeable diaphragm covers the surface of the negative electrode, the reaction chamber surrounding this negative electrode is kept very small, while the reaction chamber surrounding the positive electrode comprises almost the total amount of the electrolyte (FIG. 7).

In this manner, almost all complex former ions dissolved in the electrolyte can react during the charging of the battery with the metal passing into solution at the positive electrode, without having to diffuse first through the semipermeable diaphragm, while the passage of the complex ions to the negative electrode is effectively prevented. Thus, while maintaining the self-discharge of the battery at the same level, the same has a larger capacitance than a battery in which the electrolyte is divided by the diaphragm into two reaction chambers of comparable size (see FIG. 8).

Figure 7:
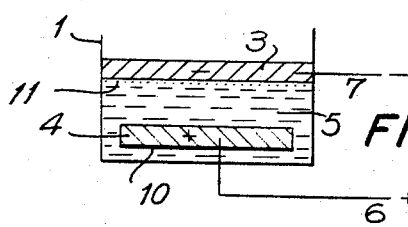
FIGS. 7 and 8 show two embodiments of the battery with a porous separator between the electrodes.

FIG. 7 shows an arrangement in which the liquid negative electrode 3 is located horizontally above the positive electrode 4 and separated therefrom by the electrolyte 5. The liquid metal 3 must here be retained by a filter or a diaphragm 11, permeable to ions, and fixed, for example, to the wall of the housing, and this diaphragm may simultaneously be a semipermeable layer.

Figure 8:
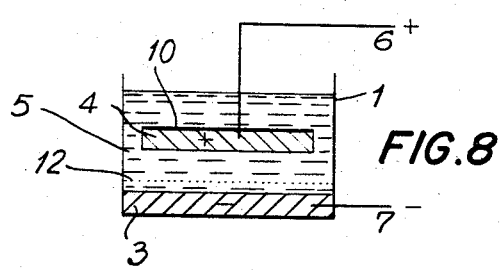

FIG. 8 shows a construction similar to that depicted in FIG. 6. However, the electrolyte 5 has mounted therein a separating semipermeable diaphragm 12 which is permeable for the smaller cations and anions, but impermeable to the substantially larger complex ions.

The embodiments hereinbefore described are closed in a gas-tight manner, as known per se. For example, the open top of the housing may be closed by securing thereto a ring seal and/or screwing in a cover, or by closing the top opening by welding.

I claim:

1. A rechargeable electrical battery cell comprising at least one metallic positive electrode and at least one negative electrode and a basic aqueous electrolyte, the electrolyte containing additional anions which are capable of reacting, during charging of the battery, with the metal of the positive electrode and with the primary reaction products formed there at during charging, to produce negatively charged complex ions which are soluble in the electrolyte, said negative electrode in the charged condition containing an amalgam of at least one metal selected from the group consisting of alkali and alkaline earth metals.

2. A battery cell as claimed in claim 1, in which the electrolyte comprises a solution of at least one hydroxide selected from the group consisting of alkali and alkaline earth metals hydroxides.

3. A battery cell as claimed in claim 1, in which the electrolyte contains a substance selected from the group consisting of cyanides and rhodanides.

4. A battery cell as claimed in claim 1, in which the electrolyte contains sulphide ions.

5. A battery cell as claimed in claim 1, in which the electrolyte contains organic anions capable of forming the said complex ions.

6. A battery cell as claimed in claim 5, in which the electrolyte contains anions of acids selected from the group consisting of formic, acetic, propionic, oxalic, tartaric, and citric acid.

7. A battery cell as claimed in claim 1, in which the electrolyte contains at least one anion of an acid selected from the group consisting of amino acids, chloroacetic acids, nitriloacetic acid, ethylene diamine tetraacetic acid and anilin diacetic acid capable of forming the said complex ions.

8. A battery cell as claimed in claim 1, in which the positive electrode contains a metal alloy capable of forming the said soluble complex ions with said anions.

9. A battery cell as claimed in claim 1, in which the positive electrode contains layers of different material selected from the group consisting of metals and metal alloys with different potentials of electrochemical reaction, and wherein said potentials differ so much from one another that during the charging the less noble layer dissolves first in the electrolyte phase, whereas the other more noble layer begins to dissolve only after the first named layer has been completely removed.

10. A battery cell as claimed in claim 1, in which in the at least partly charged state of the cell the electrolyte contains complex anions formed of the said anions of the electrolyte and a metal which has at least two valences from which at least two are used for generating the current.

11. A battery cell as claimed in claim 1, in which in the uncharged state the positive electrode contains, mercury and the electrolyte contains a compound selected from the group consisting of iodines and bromides capable of forming the said soluble complex ions with the metal of the positive electrode.

12. A battery cell as claimed in claim 1 comprising a semipermeable diaphragm, which is permeable for alkali and alkaline earth cations and for the hydroxide and complex former anions but is impermeable for the said complex ions, disposed in the said electrolyte to form two chambers such that the complex ions formed during the charging of the battery are not able to penetrate the diaphragm and become enriched in the space adjacent the positive electrode, while the smaller ions may pass from the chamber surrounding the negative electrode through the diaphragm into the electrolyte chamber adjacent the positive electrode, and in the opposite direction.

13. A battery cell as claimed in claim 12, in which the said diaphragm is disposed directly on the negative electrode.

14. A battery cell as claimed in claim 1, in which the positive electrode contains at least one metal selected from the group consisting of iron, cobalt, nickel, zinc and cadmium.

15. A battery cell as claimed in claim 1, in which the electrolyte contains hydroxide ions capable of forming the said soluble complex ions with a metal of the positive electrode selected from the group consisting of zinc, aluminum and titanium.

16. A battery cell as claimed in claim 1, in which the positive electrode consists of a core of insoluble material selected from the group consisting of graphite and magnetite, covered with a layer of an element selected from the group consisting of arsenic, antimony and tin.

17. A battery cell as claimed in claim 1, in which the positive electrode contains at least one metal capable of forming an amphoteric metal hydroxide and the electrolyte contains hydroxyl ions capable of reacting during charging of the battery with the metal of the positive electrode to produce the said soluble complex ions.

18. A battery cell as claimed in claim 8, in which the alloy is a cobalt-nickel alloy.

19. A battery cell as claimed in claim 8, in which the alloy contains copper and a metal selected from the group consisting of tin and zinc.

20. A battery as claimed in claim 1, in which the positive electrode comprises a core covered with at least one metal capable of forming the said soluble complex ions with an anion contained in the electrolyte.

21. A battery as claimed in claim 1, in which the positive electrode comprises a core containing at least one metal selected from the group consisting of silver and copper, and covered with a layer containing at least one metal selected from the group consisting of nickel and cobalt.

22. A battery as claimed in claim 1, in which the ratio of the amount of complex-forming ions in the electrolyte to the amount of complex-forming metal in the positive electrode is such that on charging of the battery a coating of an insoluble compound of the positive electrode metal with the complex-forming ions is formed on the positive electrode when the battery is fully charged whereby charging is terminated.

23. A battery cell as claimed in claim 1, in which the electrolyte contains a solvent selected from the group consisting of alcohols, ketones, pyridine and dimethylsulfoxide.

References Cited

UNITED STATES PATENTS

| | | | |
|---|---|---|---|
| 436,602 | 9/1890 | Hollingshead | 136—154 |
| 2,737,541 | 3/1956 | Coolidge | 136—20 |
| 3,067,276 | 12/1962 | Gruneberg et al. | 136—120 |
| 3,201,279 | 8/1965 | Root | 136—6 |
| 3,287,164 | 11/1966 | Arrance | 136—6 |
| 3,310,436 | 3/1967 | Ralston et al. | 136—6 |
| 3,342,640 | 9/1967 | Herold et al. | 136—6 |
| 1,684,852 | 9/1928 | Werby | 136—154 |
| 1,843,698 | 2/1932 | Ruben | 136—83.1 |
| 2,165,091 | 7/1939 | Clark | 136—153 |
| 2,588,170 | 3/1952 | Smith | 136—6 |
| 2,970,095 | 1/1961 | Kandler et al. | 136—83 |
| 2,991,325 | 7/1961 | Kordesch | 136—155 |
| 2,994,625 | 8/1961 | Mendelsohn et al. | 136—154 |
| 3,170,816 | 2/1965 | Voss et al. | 136—6 |
| 3,214,296 | 10/1965 | Smatko | 136—6 |
| 3,236,690 | 2/1966 | Booe et al. | 136—6 |
| 3,245,836 | 4/1966 | Agruss | 136—83 |
| 3,248,265 | 4/1966 | Herbert | 136—6 |

WINSTON A. DOUGLAS, *Primary Examiner.*

C. F. LeFEVOUR, *Assistant Examiner.*

U.S. Cl. X.R.

136—20, 153